Nov. 16, 1954  J. B. KIRBY  2,694,282
RECIPROCATING CUTTER AND SAW
Filed July 25, 1950  3 Sheets-Sheet 1

INVENTOR.
JAMES B. KIRBY
BY Richey & Watts
ATTORNEYS

Nov. 16, 1954                J. B. KIRBY                 2,694,282
                      RECIPROCATING CUTTER AND SAW
Filed July 25, 1950                                  3 Sheets-Sheet 2
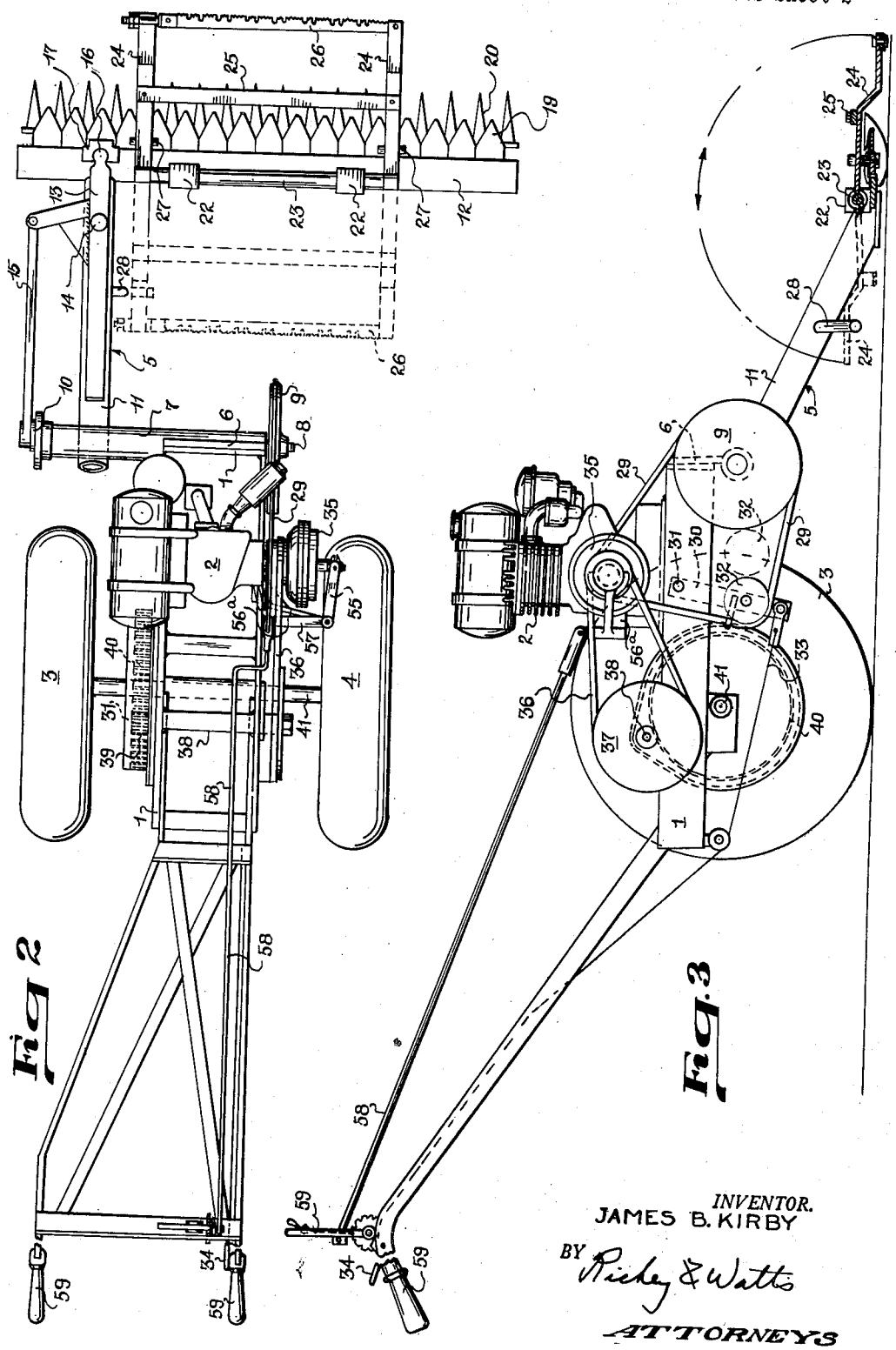
INVENTOR.
JAMES B. KIRBY
BY Richey & Watts
ATTORNEYS

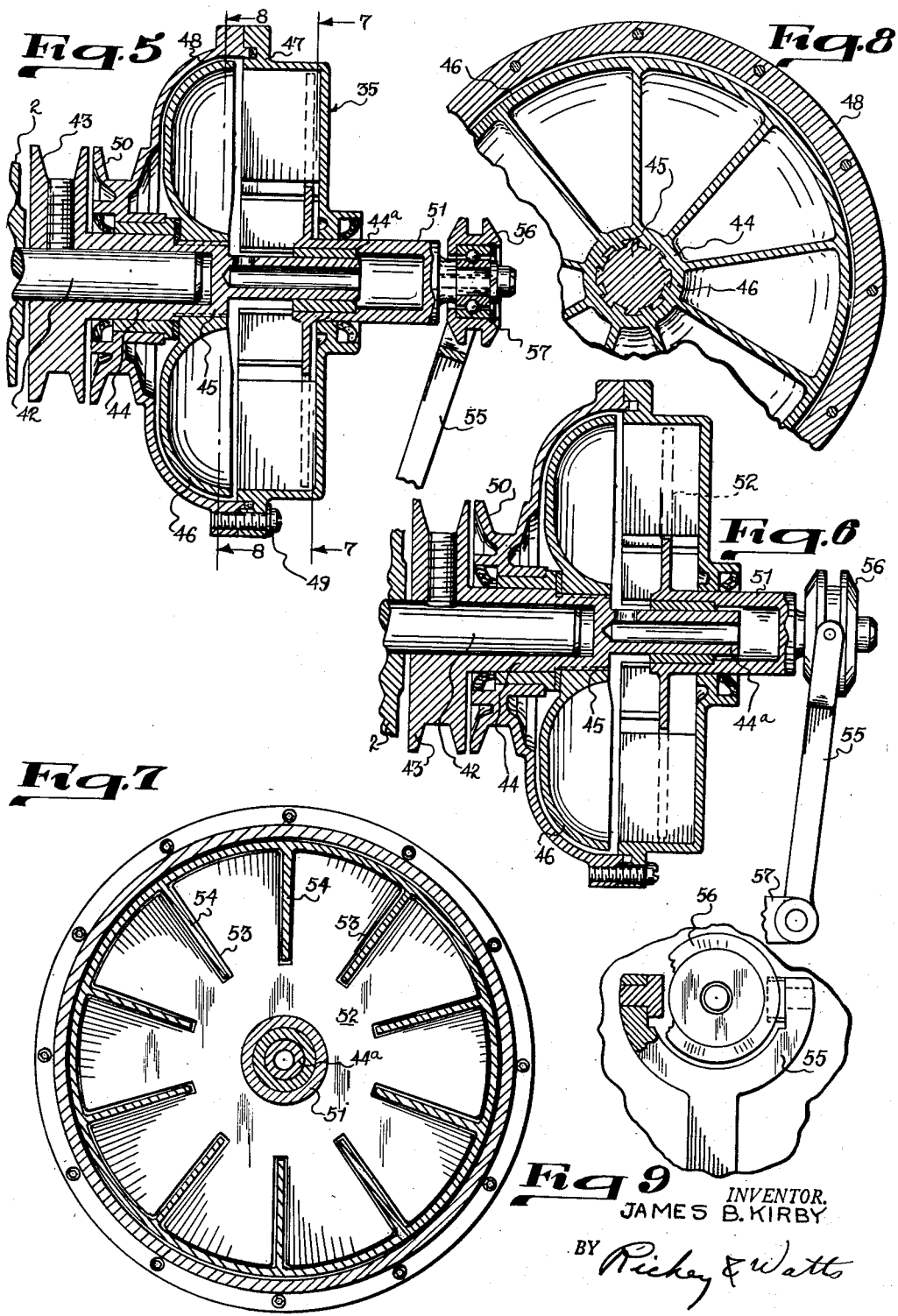

United States Patent Office 2,694,282
Patented Nov. 16, 1954

2,694,282
RECIPROCATING CUTTER AND SAW
James B. Kirby, West Richfield, Ohio Application July 25, 1950, Serial No. 175,689

2 Claims. (Cl. 56—26.5)

This invention relates to a power operated saw and more particularly to a saw arranged to be advanced toward the work by the power unit that drives the saw.

Recent developments in the farm or garden tractor art include a sickle bar attachment that is usually mounted forwardly of the tractor and which is connected to the power unit of the tractor so that the sickle bar reciprocation is produced by a direct drive from the power unit of the tractor. Such apparatus is useful in clearing brush and the like and in connection with such brush clearing, small trees and saplings are encountered that are too large to be cut by the sickle bar. Ordinarily such trees and saplings are cut away with a hand saw or separately operated power saw unit. According to the present invention it is proposed to pivotally and slidably mount a saw frame on the sickle bar support so that the frame may be swung from an inoperative or storage position in back of the sickle bar to a forward position where the saw frame is reciprocated by the sickle bar.

It is among the objects of my invention to provide a combined saw and sickle apparatus wherein a reciprocating sickle bar is driven by a power unit and the sickle bar motion is imparted to a saw blade disposed forwardly of the sickle bar, and wherein the saw blade may be swung from said forward position to a storage position rearwardly of the sickle bar where it does not adversely affect the normal use of the sickle bar mowing device.

It is a further object of my invention to provide a combined saw and sickle apparatus wherein a reciprocating sickle bar is driven by a power unit and the sickle bar motion may be transmitted to a saw blade disposed forwardly of the sickle bar and the saw is urged toward the tree being cut by means of a fluid clutch driven by the power unit.

It is a further object of my invention to provide a portable power saw wherein reciprocating motion is transmitted to a saw blade by a power unit and pressure normal to the direction of reciprocating motion of the saw blade is provided by the power unit through the medium of a manually controlled, variable slip fluid clutch.

It is a further object of my invention to provide a combined saw and sickle bar apparatus including a power unit and supporting traction wheels therefor, wherein reciprocating motion is imparted to the saw blade by the power unit and pressure is applied to the saw blade normal to the direction of its reciprocating motion by means of a variable slip fluid clutch interposed in the drive between the power unit and the traction wheels.

Other objects and advantages relating to economies in manufacture, convenience in use and efficiency in operation will appear from the following description and the appended drawings wherein:

Fig. 2 is a plan view of the power driven saw apparatus made according to my invention;

Fig. 3 is an elevation with parts in section showing the saw apparatus;

Fig. 5 is an elevation in section showing the variable slip fluid clutch employed to control the pressure on the saw;

Fig. 6 is a sectional view similar to Fig. 5 showing parts of the fluid clutch moved to a position to increase the slip between the driving and driven parts thereof;

Fig. 7 is an elevation with parts in section taken on the plane indicated at 7—7 of Fig. 5;

Fig. 8 is an elevation with parts in section showing the driving cups of the fluid clutch taken on the plane as indicated at 8—8 of Fig. 5; and Fig. 9 is a detail of the manually operated clutch yoke for the fluid clutch.

Figure 1:
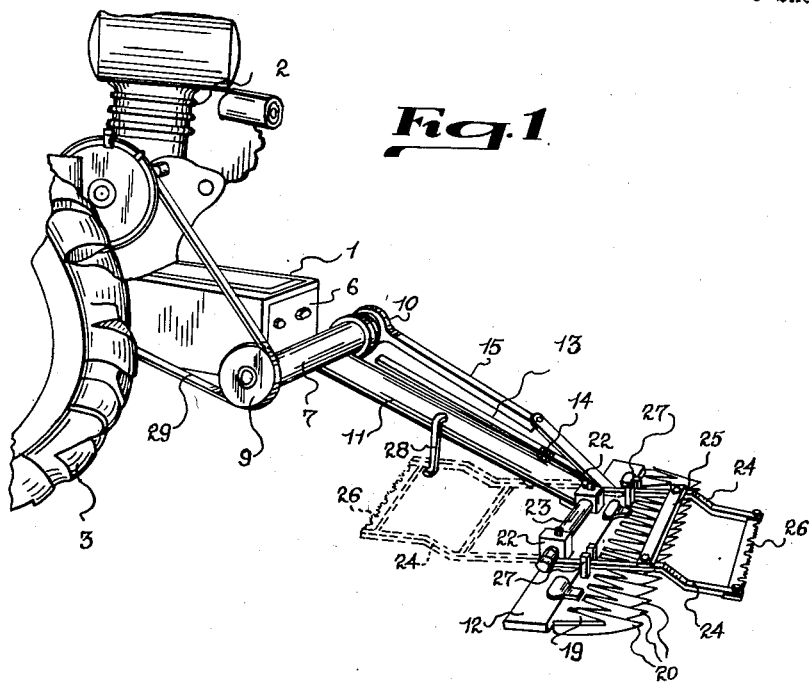
Fig. 1 is a perspective view of a tractor provided with a sickle and a saw apparatus constructed according to my invention.
Figure 4:
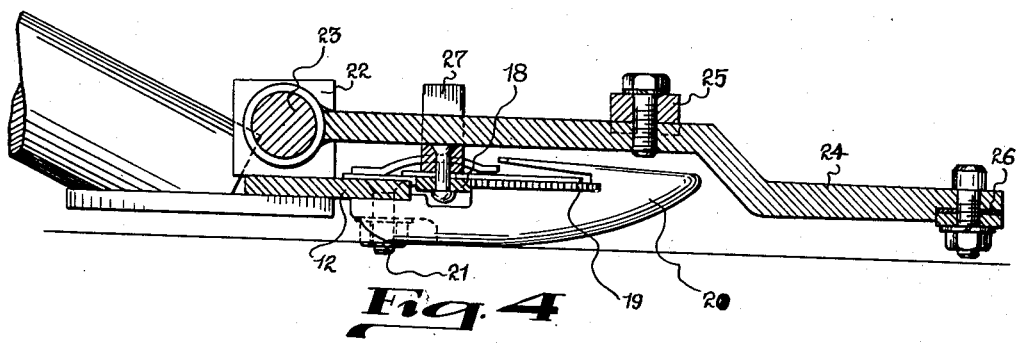
Fig. 4 is an enlarged view with parts in section showing details of the mounting of the saw on the sickle bar according to the present invention.

Referring to the drawings of that form of my invention illustrated, a two wheel tractor is provided which comprises a rectangular frame 1, a power unit 2 and traction wheels 3 and 4. A sickle bar attachment, indicated in its entirety as at 5, is secured at the forward end of the frame 1 by means of plate 6 bolted or otherwise secured to the frame. The sickle bar attachment includes a transverse supporting tube 7 which is provided with bearings to rotatably support the shaft 8 having the pulley 9 at one end thereof and the eccentric 10 at the other end. A forwardly-extending tubular support 11 is secured at one end to the underside of the tube 7 and at the other end thereof supports a transverse sickle bar support 12. A sickle bar driving member 13 is pivoted on the support 11, as at 14, and is oscillated by the connecting rod 15 secured to the eccentric 10. The rounded end 16 on the driving member 13 fits within the rounded recess in the block 17 secured to the reciprocating sickle bar 18. The sickle bar is provided with the usual triangular blades 19 which reciprocate in the slots of the guard members 20. It will be understood that the guards 20 are fixed to the sickle bar support 12 by means of the bolts 21 or the like.

To mount the saw on the sickle bar, a pair of spaced bearing blocks 22 are welded or otherwise secured to the upper horizontal surface of the sickle bar support. The saw frame includes a shaft 23 that is slidably and rotatably mounted in the bearing blocks 22. Side frame members 24 are secured at the opposite ends of the shaft 23 outside of the bearing blocks 22 and are secured to each other by a cross frame member 25 and at their forward ends by the saw blade 26. To impart to the saw the reciprocating motion of sickle bar, a pair of spaced yokes 27 are secured to the upper surface of the sickle bar 18, the spacing of the yokes on the sickle bar corresponding to the distance between the frame members 24 of the saw frame. The spacing of the bearing blocks 22 and the width of the saw frame is such that the saw frame may be moved longitudinally with respect to the bearing blocks an amount corresponding to the reciprocating stroke of the sickle bar and thus the saw frame may be swung forwardly into the position shown in Figs. 1, 2 and 3 so that the side frame members are received in the forks or yokes 27.

When it is desired to use the sickle bar alone for cutting grass or underbrush, the saw may be swung about its pivot in the bearing blocks 22 from the full line position shown in Figs. 1, 2 and 3 to the dotted line storage position. The saw is supported in its storage position by a depending bracket 28 and in said last named position the frame is substantially parallel to the ground and does not adversely affect the operation of the sickle bar as it is advanced through the grass or brush.

The drive from the power unit to the sickle bar may be conveniently controlled by a belt tightener arranged to bear against the belt 29 running from the pulley on the power unit to the driven pulley 9 for the sickle bar. The belt tightener includes a lever 30 pivoted, as at 31, on the tractor frame 1 and an idler pulley 32. The outer end of the pivoted lever 30 has fixed to it a cable 33 which leads to a hand lever 34, the arrangement being such that operation of the hand lever 34 will pull the lever 30 to the position shown in Fig. 3, wherein the belt is tightened and the power unit drive is transmitted to the sickle bar. Upon release of the hand lever 34, the idler pulley 32 may swing to the dotted line position shown which will remove the tension from the belt in the dotted line position in Fig. 3 and permit the same to slip with respect to the pulley on the power unit.

The drive to the traction wheels 3 and 4 is transmitted from the power unit 2 through a fluid clutch 35, thence through the belt 36 to pulley 37 and thence through shaft 38, pinion gear 39 to ring gear 40 fixed to the traction wheel shaft 41. The fluid clutch 35 employed in this drive is characterized by being manually adjustable so as to vary the slip between the driving and driven parts of the clutch. As shown in Fig. 5, the main crank shaft 42 of the power unit projects at one side of the power unit and the pulley 43 which is belted by means of belt 29 to the sickle drive pulley 9 is fixed to the extension of shaft 42. The hub of the pulley 43 is provided with an extension 44 which has splined thereto, as at 45, the driving element 46 of the fluid clutch. The driven element of the fluid clutch comprises the two complementary housing sections 47 and 48 secured to each other as at 49. The section 48 has integrally formed therewith the V pulley 50 which receives the V belt 36 for transmitting the drive to the traction wheels. The extended tubular section 44a on the hub 44 serves to support a telescoping tubular member 51 which carries a radial disc 52 slotted, as at 53, to accommodate the blades 54 integrally formed with the driven clutch element 47. The member 51 and the slotted disc 52, carried thereby, is adapted to be moved axially toward and away from the driving element of the clutch 46 so that the effective depth of the pockets between the plates 54 of the driven element of the clutch is varied depending upon the position of the slotted plate 52 with respect to the driving element of the clutch. In Fig. 5 the slotted plate 52 is shown as being moved away from the driving element of the clutch so as to provide for the maximum depth of the pockets in the driven part of the clutch and this corresponds to a minimum slip condition, wherein the fluid clutch is operating in its maximum efficiency. In the position of the slotted plate 52, shown in Fig. 6, the depth of the pockets in the driven part of the clutch has been decreased so as to increase the slip between the driving and driven parts of the clutch. Referring to Fig. 6, it will be understood that the plate 52 may be moved still closer to the driven part of the clutch so as to effectively eliminate the fluid pockets in the driven part of the clutch and this last described position would correspond to the maximum slip that could be obtained between the driving and driven parts of the clutch. It will be understood by those skilled in the art that with the plate 52 in the position last described there would be practically no torque transmitted from the shaft 42 of the power unit to the pulley 50 carried by the driven part of the fluid clutch.

The position of the slotted plate 52 within the clutch is controlled by the pivoted fork 55 which engages the grooved ring 56 carried by means of bearings 57 on the reduced end portion of the member 51. The clutch actuating member 55 is pivotally supported on a bracket 56a carried by the power unit and includes an arm or bell crank member 57 that is connected to a control rod 58 which terminates in a hand lever 59 which may be manually operated and adjusted so as to control the amount of slip in the fluid clutch.

In the normal operation of the tractor using the sickle bar, the fluid clutch is adjusted to the position shown in Fig. 5 so that the maximum torque is transmitted through the clutch from the power unit to the traction wheels and the belt tightener for the belt 29 is adjusted, as shown in its full line position in Fig. 3, to drive the sickle bar. When, however, it is desired to use the saw 26, a tractor is stopped by moving the fluid clutch control to provide for the maximum slip in the clutch and thus interrupt the drive to the traction wheels. The belt tightener 30 is moved to the dotted line position, shown in Fig. 3, so as to interrupt the drive through the belt 29 leading to the sickle bar drive. The saw frame is then swung from its dotted line position to the full line position, shown in Figs. 1, 2 and 3, with the side frame members 24 disposed in the forks 27 carried by the sickle bar. With the saw in its forward position and operatively connected to the sickle bar the belt 29 is tightened by the belt tightener 30 to re-establish the drive to the sickle bar and thus reciprocate the saw blade 26. The fluid clutch control lever 59 is then operated so as to transmit through the traction wheels the desired pressure on the saw blade 26. It will be understood by those skilled in the art that the pressure on the saw blade exerted by the traction wheels, which is in a direction normal to the reciprocating movement of the saw, may vary somewhat depending upon the nature of the wood in the tree being sawed. It will be appreciated that this pressure on the saw normal to the direction of its reciprocation may be conveniently varied by manipulation of the handle 59 by the operator and that with this fluid pressure control it is unnecessary for the operator to exert any pressure on the saw blade through the medium of the guiding handles 59.

It will also be understood that the variable slip fluid clutch control that I have provided for the traction wheels so as to provide pressure for a saw normal to the direction of saw movement may be utilized in other types of saws such as, for instance, a chain tooth saw and a rotary saw and that the variable slip fluid clutch control is also useful in controlling the forward speed of the tractor when operating the sickle bar alone or when operating other tractor attachments.

Although I have shown and described one form of my invention in considerable detail, it will be understood that numerous modifications may be made therein within the scope of the appended claims.

What I claim is:

1. A portable saw comprising a power unit, wheels to support the power unit, a fixed bar support and a reciprocating bar mounted in said fixed support, said reciprocating bar being operatively connected to said power unit, a saw frame pivotally and slidably mounted on said fixed support, whereby the saw frame may be bodily moved about its pivotal mounting to a position forwardly of the reciprocating bar or to a position rearwardly thereof, and means carried by the reciprocating bar engaging said frame to reciprocate the same when it is moved into said forward position.

2. In combination, a power unit, traction wheels supporting the power unit, a sickle bar support carried by said unit and reciprocating sickle bar mounted in said support and operatively connected to said power unit to be driven thereby, a saw frame pivotally and slidably mounted on said support, whereby the saw frame may be bodily rotated about its pivotal mounting to a position parallel to and forwardly of the sickle bar or to a position rearwardly thereof, and means connecting the sickle bar to the saw frame to reciprocate the frame when the same is moved to its said forward position, and means operatively connecting said power unit to said traction wheels including a manually operated, variable slip fluid clutch, whereby pressure on the saw normal to the direction of its reciprocation may be varied by varying the torque applied to the traction wheels.

References Cited in the file of this patent

UNITED STATES PATENTS

| Number | Name | Date |
|---|---|---|
| 561,587 | Hillebrand | June 9, 1896 |
| 800,483 | Perrey | Sept. 26, 1905 |
| 1,294,368 | Amon | Feb. 18, 1919 |
| 1,445,039 | Pribnow | Feb. 13, 1923 |
| 1,609,651 | McMillan | Dec. 7, 1926 |
| 1,891,526 | Kupuis | Dec. 20, 1932 |
| 2,258,302 | Ronning | Oct. 7, 1941 |
| 2,270,545 | Neracher et al. | Jan. 20, 1942 |
| 2,329,881 | Clapper | Sept. 21, 1943 |
| 2,426,694 | King | Sept. 2, 1947 |
| 2,435,192 | Arsneau | Feb. 3, 1948 |
| 2,489,014 | Degelman | Nov. 22, 1949 |
| 2,601,752 | Rose | July 1, 1952 |